March 19, 1974  A. E. GILCHRIST  3,798,150
APPARATUS FOR THE TREATMENT OF LIQUORS USING
POROUS DEPOSITION ELECTRODES
Filed Jan. 3, 1972  3 Sheets-Sheet 1

United States Patent Office 3,798,150
Patented Mar. 19, 1974

3,798,150
APPARATUS FOR THE TREATMENT OF LIQUORS USING POROUS DEPOSITION ELECTRODES
Allan E. Gilchrist, Westlake, Ohio, assignor to SCM Corporation, Cleveland, Ohio
Filed Jan. 3, 1972, Ser. No. 214,650
Int. Cl. B01k 3/04
U.S. Cl. 204—272          7 Claims

ABSTRACT OF THE DISCLOSURE

Pressure cell apparatus for the treatment of electrically conductive feed liquor is set forth. The conformation of the apparatus is broadly that of a shell-and-tube heat exchanger that can be of the single pass or multipass variety, and it can have substantially straight or bent tubes, including tubes with return bends. However, in this apparatus tubes are electrodes, and they are microporous. Electrode means of polarity opposite the tubes are provided; e.g., in the form of one or more charged heads or elements between such head or heads and the tube ends proximate thereto. Preferably the counter electrodes actually extend into the tubes. Appropriate fluid inlets and outlets and electrical terminals are provided.

---

This invention is an improvement in a cell apparatus for the electrolytic treatment of electrically liquor containing in dispersed phase, a fluent material electrodepositable on an electrode. The apparatus is especially adapted to treating aqueous electrocoating paint dispersions and rinse waters from electrocoating operations.

Many types of cell apparatus having a porous electrode have been used heretofore in the treatment of an electrically conductive liquor containing suspended electrodepositable material therein. One type of apparatus is shown in U.S. Pat. 1,603,298 wherein the apparatus is adapted for removing copper and iron salts from a liquid medium. It comprises an impervious shell having mounted therein, two porous plate-like electrodes having opposed charge during operation. To effect separation of a mixture of copper and iron salts with this apparatus, a voltage is applied and regulated so that the copper and iron salts are not plated out on the electrodes, but are drawn to separate electrodes and forced through the porous electrode to a collection chamber.

U.S. Pat. 2,640,026 discloses an apparatus for removing and filtering suspended bodies from a liquid medium. The apparatus comprises annular metallic canductive or foraminous screens adapted for conducting electrical currents. To effect separation, the liquid and particles therein are drawn by electrical means to the foraminous screen. Particulate material suspended in the liquid is removed by means of the charged screens, the particulates collecting therein, while the liquid passes through the screen to a collection tank.

Tainton, in U.S. Pat. 1,231,967 shows a process for removing metals from their solution and apparatus for carrying out such process. The apparatus comprises an impervious shell with a porous cathode having a pore size of not substantially greater than about 100 microns and a secondary electrode of opposite charge. Feed liquor containing electrodepositable material is passed through the porous cathode and attracted to and plated thereon. Fines escaping from the cathode are retained on a filter cloth in front of the second electrode, the liquid passing therethrough and through the secondary electrode into a discharge chamber.

Juda, in U.S. Pat. 2,741,595 discloses an apparatus of the electrodialysis type where ionic membranes are used to cause separation of ionic materials. The electrodes in the apparatus are in the form of successive turns and spaced so that there is a series of cell solution passageways between them in the apparatus. Recurring electrodialysis between a single pair of electrodes in obtained.

The instant invention provides an attractive apparatus for the treating of an electrically conductive feed liquor containing in dispersed phase, fluent material electrodepositable on an anode or a cathode. It provides an apparatus suitably adapted for concentrating and recovering electrocoating binder and paints, dewatering electrocoating baths, and generally providing for the electrolytic treatment of various conductive liquors. It also provides high electrode surface area for a small amount of floor space affording efficiency of operation.

An aspect of this invention is a pressure cell apparatus of a design similar to a shell and tube exchanger having a single tube sheet and single head means with feed liquor fed into the shell side and concentrated deposit drawn from the tubes.

A second aspect of the invention is a pressure cell apparatus of a design similar to a shell heat exchanger having dual head means and dual tube sheet means. Feed liquor is preferably fed into the tubes and concentrated depositable material drawn from the shell.

A third aspect of the invention is a cell apparatus of a design similar to a shell and tube heat exchanger where the tubes are in spaced-apart relationship and their longitudinal axis substantially parallel.

A fourth aspects of the invention is a cell apparatus having the tubular electrodes arranged to provided for multipass operation.

A fifth aspect is a pressure cell apparatus of a design similar to a shell and tube heat exchanger having counter electrodes mounted inside the tubular electrodes.

A sixth aspect of the invention is a cell apparatus having head means adapted to act as a counter electrode in said apparatus.

A seventh aspect is a pressure cell apparatus having a packing adjacent to the wall of the tubular electrodes to reduce turbulence at the surface, thereby minimizing back mixing of depositable material.

Broadly, the apparatus of this invention is a pressure cell apparatus comprising:

(1) an impervious shell having aperture means for passage of fluid;
(2) an array of tubular electrodes extending into said shell chamber and having at least one open end per tubular electrode, said electrodes being microporous at least as to a portion thereof of extending into said shell chamber and being readily permeable to said feed liquor, the interiors of said tubular electrode not otherwise communicating with a shell chamber thereabout formed by said shell;
(3) at least one tube sheet means securing said array of tubular electrodes in said shell;
(4) impervious head means disposed for forming at least one chamber between itself and at least one tube sheet means, the open ends of said array of tubular electrodes communicating with said chamber, said head means having aperture means for passage of fluid;
(5) counter electrode means electrically chargeable to polarity opposed to said tubular electrode; and
(6) electrical termini for charging said tubular electrodes and said counter electrode means.

The apparatus of this invention is highly desirable for treatment of an electrically conductive fluid containing electrodepositable material therein. As mentioned earlier, one of the primary applications of this apparatus is in the treatment of electrocoating paint baths and electrocoating rinse waters. Separation and concentration of electrocoating paint of either the cathodic or anodic types can be done at relatively low cost affording economical opportunity for recovery of such electrodepositable material. Often, prior to this invention, the material was discharged to the sewer as effluent. The apparatus can also be used for treating liquors such as black liquor from the pulping operation for making kraft paper, sewage, liquors containing inorganic pigment, metal salts, ionic salts, acids, or alkali to remove either ion or both ions. These solutions can contain dispersed or dissolved non-ionic materials.

The method of operating the apparatus is substantially the same as that described in my copending applications filed in the United States having filing dates Mar. 8, 1971 and July 27, 1971, and corresponding Ser. Nos. (1970 series) 122,001 and 166,436 now Pat. No. 3,679,565, respectively, and such information is incorporated by reference. Briefly, the process as set forth in these applications comprises passing a feed material containing electrodepositable material into a cell chamber having electrodes as the boundary thereof, with at least one of the electrodes having a microporous section; properly charging the electrodes for effecting migration of the electrodepositable material contained in the feed liquor to said microporous electrode and establishing fluid pressure in the cell for forcing the deposited material through the microporous tubular electrode. The concentrate then is recovered from the chamber adjacent to the porous cell. The rate of liquid vehicle passing through the microporous section of the electrode can be minimized by maintaining a thin layer; e.g., 1 mil, of electrodepositable material on the electrode. The liquid pressure used to force the deposited material through the electrode pushes and squeezes the deposited material causing a certain degree of dehydration and resultant concentration.

Figure 1:
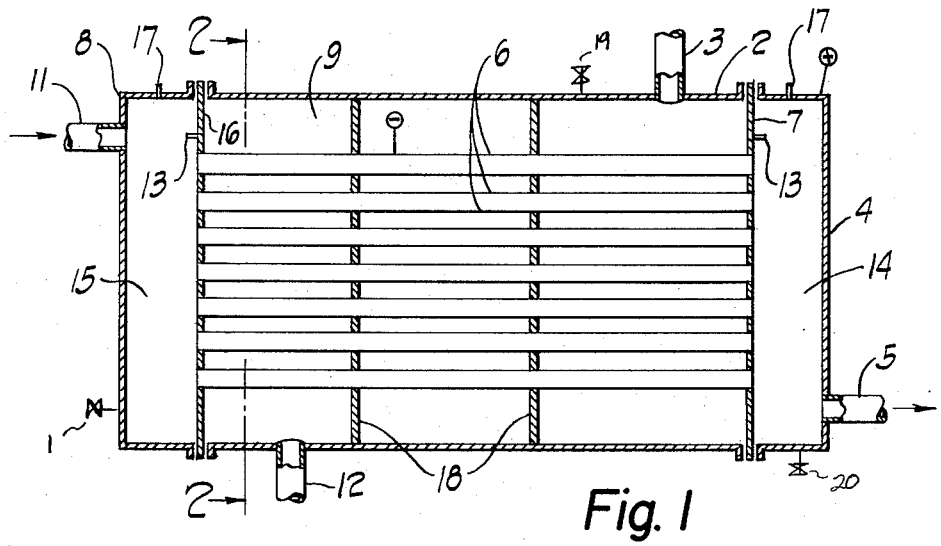
FIG. 1 is a cross-sectional view of an embodiment of the invention conforming to a shell and tube heat exchanger, the apparatus containing tubular electrodes with the heads constituting the counter electrodes.

Referring to FIG. 1, shell 2 defines a chamber for collecting of concentrated material or for feeding liquor to the electrical apparatus. The shell has aperture means 3 and 12, the aperture means being capable for allowing passage of fluent material into or out of the shell chamber; e.g., feed liquor into the shell chamber or removal of a concentrated electrodeposited material or stripped liquor as it is discharged from its shell. Dual head means 4 and 8 having aperture means 5 and 11 respectively, communicate with the shell casing. Each head is connected to a flange (gasketing not shown), and bolted to the shell although other connecting means can be used. Gas vent means 1, 19, and 20 are provided in the heads and in the shell of the apparatus for venting gas generated during operation. A first chamber 14 is formed between tube sheet 7 and head means 4 by the attachment of the head means to the shell. The head means and tube sheet are electrically insulated from each other so as not to short out when they are charged. A second chamber 15 is formed by the attachment of head means 8 and tube sheet 16. These chambers are sealingly separated from shell chamber 9 to prevent fluid from passing from the first and second chambers to the shell chamber. Secured in the tube sheet means are an array of tubular electrodes 6. The tubular electrodes are mounted so that their longitudinal axis are substantially parallel with each other and in spaced-apart relationship; i.e., so that their external surfaces do not touch. A space of about $\frac{1}{16}$ of an inch to about $\frac{3}{8}$ of an inch is desirable for permitting the concentrated deposit to flow along the tubes and collect in shell chamber 9. Also such spacing allows for easier cleaning and efficient maintenance. Spacings of more than about 1½ inches can be used, but generally are not for reasons of efficient use of space.

The ends of the tubular electrodes are secured by the tube sheet means 7 and 16. Only two tube sheets are shown, however, additional support for the tubes can be provided by baffles spaced between tube sheets 7 and 16. The baffles 18 help prevent deviation of the tubular electrodes in the midsection; i.e., from contacting each other.

The tubular electrodes 6 communicate with the shell chamber 9 by means of pores, the pore size being approximately 5–10 microns in size, and preferably 20–80 microns. The pores are readily permeable to feed liquor and also permeable to the electrodeposit. The porous section can extend the full length of the shell chamber or only a portion thereof. For reasons of efficiency, it is preferred to have the porous section extend the full length.

To separate electrodepositable material from a feed liquor by using the apparatus shown in FIG. 1, feed liquor is passed through head aperture means 11 into the second chamber which is the inlet chamber. When feed liquor is introduced, head means 4 and 8 are appropriately charged. For example, they are of a negative charge when the feed liquor contains anodic electrodepositable paint. The tubular electrodes 6 are positively charged. The head means 4 and 8 are charged through electrical terminus 17 at each end. The tubular electrodes are charged to opposite polarity or anodically charged through electrical terminus 13 communicating with the tube sheets 7 and 16. Electrical contact is provided for by the feed liquor between the electrodes.

Feed liquor is forced into tubular electrodes 6 and at this point, electrodeposition of the electrodepositable material begins on the interior surface of the tubular electrodes. As the feed liquor passes into the tubular electrodes 6, the electrodepositable material migrates to the tubular electrode surface. By applying sufficient pressure in the tubes, as for example by a pump, the electrodeposit is forced through the pores of the tubular electrodes to the external surface thereof. There, the electrodeposit flows from the external surface of the tubular electrode and collects in shell chamber 9. This electrodeposited material is in concentrated form from its original feed state. Often by controlling voltage, cell pressure, and flow rate, the solids content in the concentrate may run as high as 50%, whereas initial feed concentrations may be 5–10%. The concentrate then is collected from the shell chamber through aperture means 3 and 12. The stripped feed liquor; that is, feed liquor stripped of a proportion of the electrodepositable material continues to flow through the tubular electrodes and collects into first chamber 14 and is withdrawn from that chamber through head aperture means 5. The stripped liquor then can be recycled as make up for additional feed, or it may be discharged to the sewer.

Another method of operating the apparatus of FIG. 1 is to introduce feed liquor into the shell chamber through aperture means 3 and withdraw stripped liquor through the second aperture means 12. With the electrodes properly charged, the electrodepositable material will migrate to the external surface of the tubular electrodes 6 and by means of force; e.g., fluid pressure, pass through the pores in the tubular electrode and collect on the internal surface thereof. The electrodeposit then will flow out the ends of the electrodes and collect in first chamber 14 and second chamber 15 where it is withdrawn therefrom through aperture means 5 and 11 in the heads 4 and 8 respectively.

Figure 2:
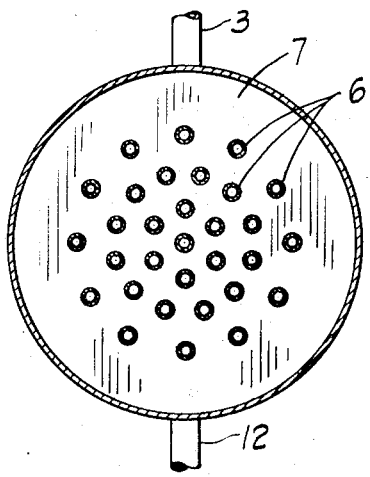
FIG. 2 is a cross-sectional view of the apparatus of FIG. 1, along the plane 2—2 showing the relationship of the shell aperture means and tubular electrodes mounted therein.

FIG. 2 corresponds to a cross-sectional view of the apparatus of FIG. 1 along plane 2—2 and illustrates the arrangement of tubular electrodes 6 secured in the tube sheet 7 and the shell 2. The aperture means 3 and 12 are shown as communicating with the shell.

Figure 3:
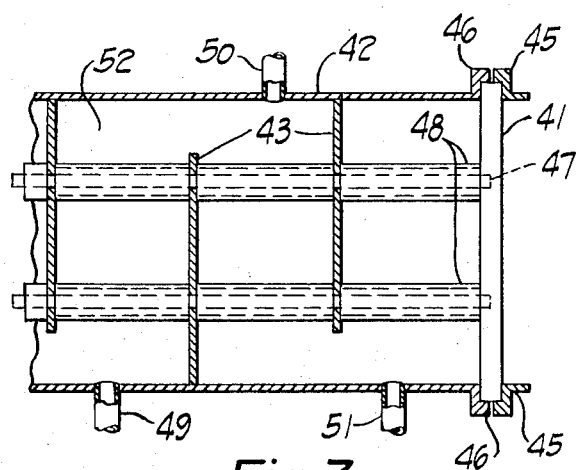
FIG. 3 is a cross-sectional view of a mounting assembly of the tubular electrodes and counter electrodes secured in the tube tube sheet—the tube sheet mounted against the shell flange and held there by a channel flange for attachment to a head. Electrical termini and electrical insulating means are not shown.

FIG. 3 is a cross-sectional view illustrating a typical mounting of the tubular electrode and porous counter electrode in the shell. Referring to FIG. 3, tube sheet 41 is abutted against the shell flange 46 communicating with the shell 42. Optionally disposed between the tube sheet and the shell flange is a sealant material such as that made of rubber, so that a tight fit can be established between the tube sheet and the shell flange. Additionally, where necessary, an electrically insulating gasket is provided to eliminate short circuiting where the head acts as the counter electrode. A head, not shown, normally abuts against flange 45, the flange communicating with the tube sheet and sealing against the tube sheet so that liquid cannot flow through the tube sheet into the shell chamber but only through the tubes. Tube sheet 41 secures a plurality of tubular electrodes 48 at the ends which holds porous counter electrodes 47. The porous section of the tubular electrodes 48 allows the electrodes to communicate with the shell chamber 52. Baffles 43 are optionally disposed in the shell chamber for directing flow of the concentrate to exit; i.e., aperture means 49, 50, and 51 in the shell chamber and to provide support for the tubular electrodes.

Figures 4, 4A:
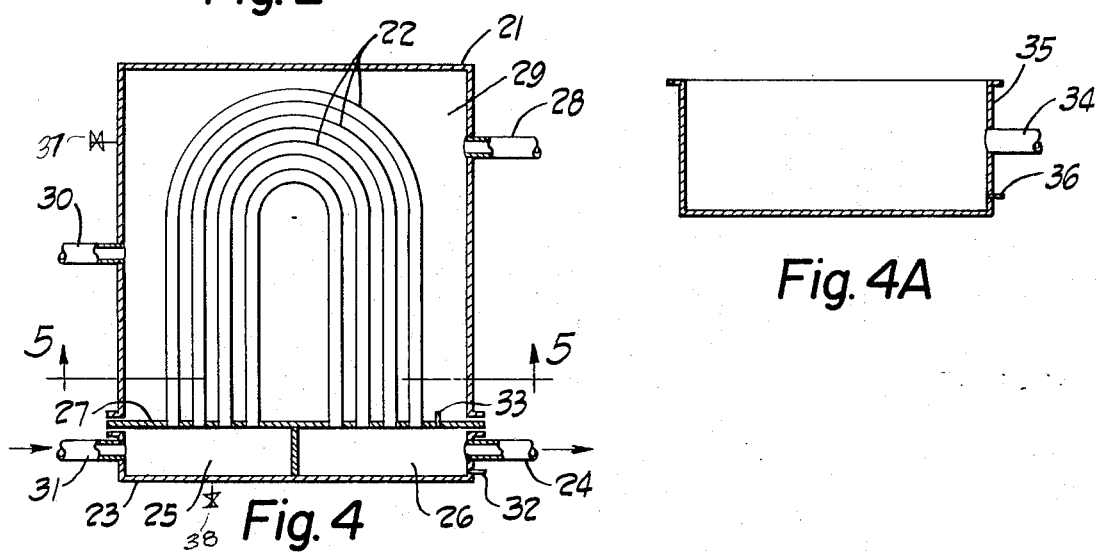
FIG. 4 is a cross-sectional view of a cell apparatus having a head means where the tubular electrodes are U-shaped. One end of the tubular electrodes communicates with an inlet chamber, the other end communicates with an outlet chamber formed by a unitary head means.
FIG. 4a is a cross-section of another type of head means which can be used in the apparatus of FIG. 4. It is used where feed liquor is introduced into the shell side and concentrate drawn from the chamber formed between the head and tube sheet and communicating with the open ends of the tubular electrodes.

FIG. 4 is a cross-sectional view of another type of apparatus embodied by this invention. The basic design of this apparatus is different from the other described heretofore in that the tubular electrodes are U-shaped and connect for providing a two-pass system, depending on how the flow operation is conducted. The apparatus comprises shell 21 which defines a shell chamber 29 for introduction of feed liquor or removal of concentrate. The shell has aperture means 28 and 30 capable for withdrawing stripped liquor or introducing feed liquor to and from the shell chamber respectively. Tube sheet 27 communicates with the shell, thereby defining a boundary with the shell chamber 29 and first and second chambers 25 and 26. The tube sheet acts to sealingly dispose the shell chamber from the first and second head chambers. The head chambers 25 and 26 are formed by the abutment of the head means 23 against the tube sheet 27. Both are sealingly and electroinsulatingly mounted with respect to each other and the shell. Head aperture means 24 and 31 are adapted for introduction of feed material or withdrawing of stripped liquor. Referring to the drawing, feed liquor is introduced through head aperture means 31 into first chamber 25. The tubular electrodes are charged through electrical terminus 33 communicating with the tube sheet and the head means charged to opposite polarity through electrical terminus 32. The feed liquor is forced by feed pressure from the first chamber 25 into the porous tubular electrodes 22, these electrodes having porosity similar to that of the apparatus of FIG. 1. Feed liquor flows through the one leg of the U around, and back down; i.e., the other leg (hence, dual pass) into second chamber 26. As the feed liquor flows through the dual pass unit, the electrodepositable material is coated on the internal surface of the electrodes and is forced into shell chamber 29. The resultant concentrated electrodeposited material is withdrawn through shell aperture means 28. The stripped liquor is withdrawn from second chamber 26 through head aperture means 24. Any gas generated during the operation may be vented from the apparatus through gas vents 37 and 38.

FIG. 4a illustrates a head 35 which can be used in place of head means 23 in the apparatus of FIG. 4. It differs from the head shown in FIG. 4 in that only one chamber is formed. In operation, feed can be introduced through shell aperture means 28 and stripped feed liquor withdrawn through aperture means 34 in head 35. The process is otherwise basically the same as that described for the operating apparatus of FIG. 4.

Figure 5:
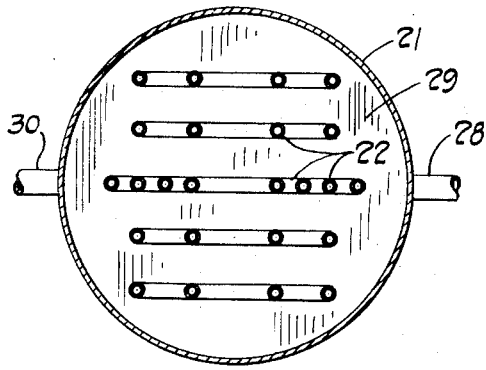
FIG. 5 is a cross-sectional view of the apparatus of FIG. 4 along the plane 5—5.

FIG. 5 is a cross-sectional view of FIG. 4 along the plane 5—5 illustrating the arrangement of the tubular electrodes in the apparatus, the tube sheet and shell chamber.

Figure 6:
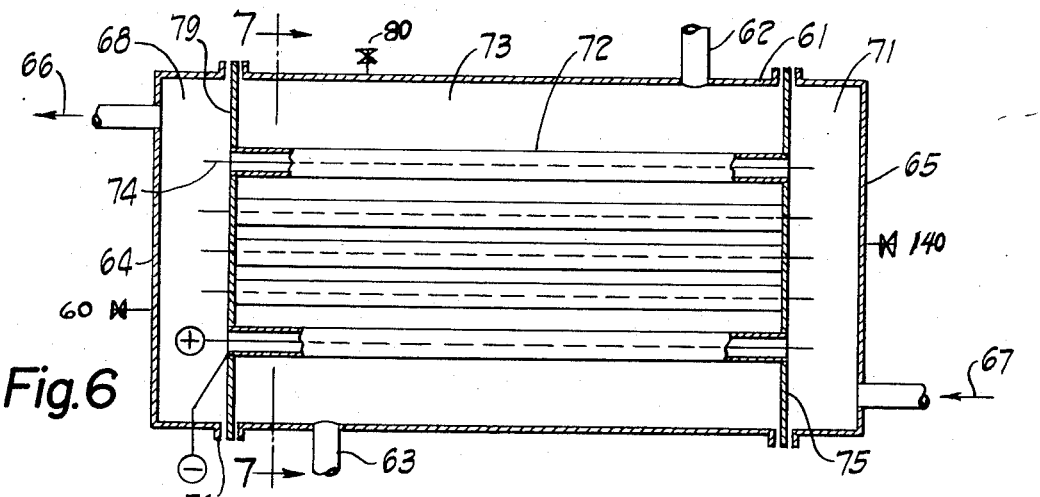
FIG. 6 is a cross-sectional view of cell apparatus wherein a counter electrode is mounted within each of the tubular electrodes and constitutes the counter electrode in the apparatus.

FIG. 6 is a cross-sectional view of apparatus having counter electrodes mounted inside of the tubular electrodes and electrically insulated (not in physical contact) therefrom. The apparatus comprises shell 61 defining a shell chamber 73, the shell having aperture means 62 and 63 for either introducing feed liquor or withdrawing concentrated product from the shell chamber. First head means 64 and second head means 65 are disposed away from each other, one of the heads being mounted against the shell casing at one end, the other head mounted against the shell casing at the other end. Each head has an aperture means 66 and 67 respectively, therein for effecting flow of fluid therethrough. Aperture 66 is located in first head 64 as aperture 67 is located in second head 65. Tube sheets 75 and 76 are sealingly mounted in the shell casing forming a first chamber 68 between tube sheet 76 and first head 64 and a second chamber 71 between tube sheet 75 and second head 65. These two tube sheets additionally provide for shell chamber 73 sealingly disposed between the head chambers. A plurality of tubular electrodes 72 are disposed in the shell chamber and communicate therewith by means of a porous section. The ends of the tubular electrodes are secured in tube sheets 75 and 76. Mounted inside the tubular electrodes are wires which are electrically insulated from the tubular electrodes and constitute counter electrodes 74. The counter electrode extends the length of the tubular electrode and is mounted therein. Often, several mounting assemblies are required where the tubular electrodes are long; e.g., 5–10 feet. Operation of the apparatus is substantially like the apparatus previously described. The electrodes are charged so that electrodepositable material will deposit on the tubular electrode and be forced through the porous section for recovery in concentrated form. Any gas generated by the operation can be vented through gas vent means 60, 80, and 140. One desirable feature of a long counter rod electrode is that it often provides greater efficiency of deposition than using the heads as a counter electrode as the distance between the plating surface of the tubular electrode remains constant. Also, longer tubular electrodes can be used where the counter electrode is mounted inside the tubular electrode as the distance between the electrode surfaces is small.

Figure 7:
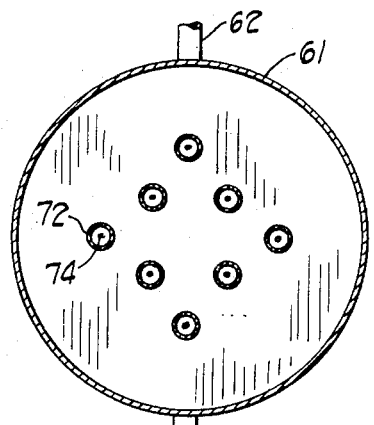
FIG. 7 is a cross-sectional view of the apparatus of FIG. 6, along the plane 7—7.

FIG. 7 is a cross-section of FIG. 6, along plane 7—7 as indicated, showing the location of the tubular electrodes, tube sheet, counter electrode, shell casing, etc. of the apparatus of FIG. 6.

Figure 8:
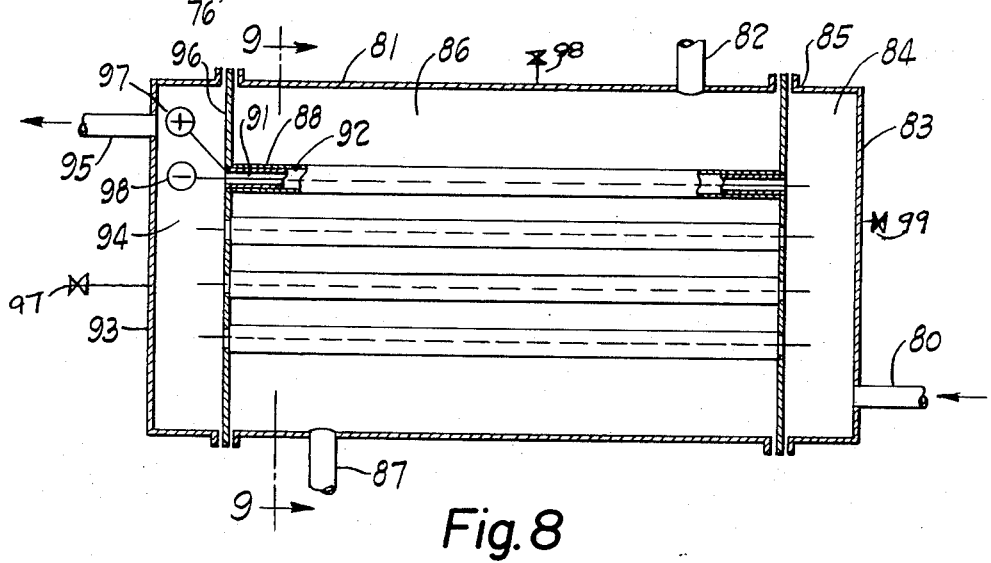
FIG. 8 is a cross-sectional view of cell apparatus similar in design to that of FIG. 6. It differs in that a packing is mounted at the surface of the interior of the tubular electrode for reducing turbulence at the surface of the tubular electrode and minimizing back flow.

FIG. 8 is a cross-sectional view of an apparatus substantially similar to that shown in FIG. 6. The apparatus comprises a shell 81 having aperture means for introduction of feed liquor or withdrawal of concentrate. The shell apertures are designated as 82 and 87. Tube sheet 85 and 96 are disposed in the shell defining a shell chamber 86 which is sealingly disposed from a first head chamber 94 and a second head chamber 84 formed by the attachment of head means 93 and 83 respectively. The heads and tube sheets are electrically insulated from each other by gasket means not shown. The heads and tube sheets are charged via electrical terminus to constitute a working cell. Tubular electrodes 88 are mounted in the shell with the ends secured by the tube sheets. Their axis are substantially parallel on a longitudinal basis, and they communicate with the shell chamber by means of a porous section in the tubular electrode. Counter electrodes 91 of a rod-like nature are mounted inside the tubular electrodes for charging to a polarity opposite to that of the tubular electrodes. Gas vent means 97, 98 and 99 are provided in the apparatus for the removal of any gas generated.

The basic difference in this apparatus from that of FIG. 6 is the coupling of a turbulence arrestor 92 against the internal wall of the tubular electrodes. The turbulence arrestor generally is a non-conductive packing of a soft material, such as cloth, fabric, or webbing, and inert to the feed liquor. Additionally, it is readily permeable to the feed liquor and electrodepositable material so that the electrodepositable material can deposit on the wall of the tubular electrode and be pushed by fluid pressure into the shell chamber. An advantage of using a turbulence arrestor in the tubular electrode is that it minimizes turbulence at the wall surface. Turbulence has a tendency to cause the electrodepositable material to back-flush into the main stream of feed liquor passing through the tubular electrode and be carried away in the stripped feed. The packing typically has a thickness of 1/16 inch to 1/4 of an inch, however, thickness is dependent on the size of the tubular electrodes used and flow rates of feed liquor through the tubular electrodes.

Figure 9:
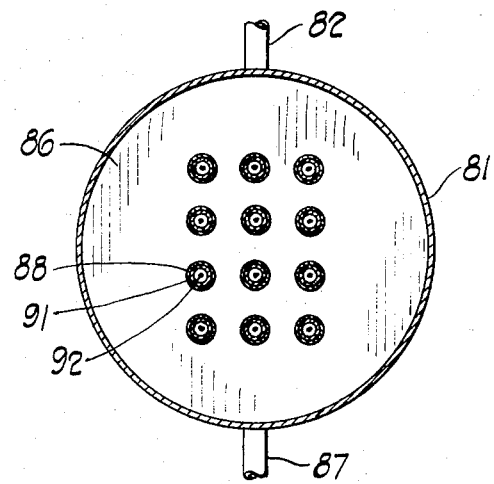
FIG. 9 is a cross-sectional view of the apparatus of FIG. 8 taken along the plane 9—9. It shows the spacing of tubes, packing, and counter electrode.

FIG. 9 is a cross-sectional view of the apparatus of FIG. 8 illustrating the tubular electrodes, counter electrodes, and the packing arrangement in the apparatus. In FIG. 9 counter electrode is designated as 91, the turbulence arrestor as 92, and the tubular electrodes as 88. Shell chamber 86 is shown and communicates with the porous section of the tubular electrodes as stated.

Figure 10:
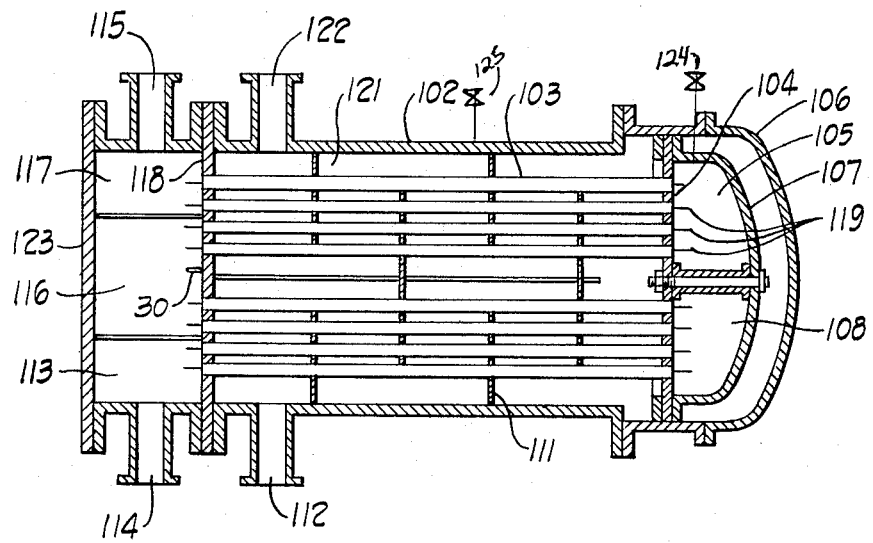
FIG. 10 is a cross-sectional view of an apparatus having multipass capability in this case 4 passes through the tubular electrodes.

FIG. 10 is a cross-section of a multipass cell apparatus unit adapted for practicing this invention. This particular apparatus has four tube passes, so that feed liquor, when introduced, will have four passes through the tubes prior to withdrawal as stripped feed, each pass resulting in further deposition and removal of depositable material. The multipass apparatus comprises shell 102 defining a shell chamber 121. The shell contains shell apertures 112 and 122 for introduction and removal of feed liquor or concentrate, depending on how the apparatus is operated. In typical operation, the apertures are used for removal of concentrate; i.e., electrodepositable material which is caused to be forced through the porous section of the tubular electrodes. Disposed at ends of the shell chamber are tube sheets 104 and 118. These tube sheets are sealingly disposed providing for a shell chamber and head chambers, the head chambers being isolated from the shell chamber. An internal chamber head 107 is mounted against tube sheet 104 and is designed so that it forms a first chamber 105 and a second chamber 108 between the tube sheet and itself. Tubular electrodes 103 having a porous section communicating with the shell chamber 121, are secured at the ends by tube sheets 104 and 118. Baffles 111 are optional, but sometimes preferable, as they can prevent deviation of the tubular electrodes at points between the tube sheets, as well as for providing direction of flow of concentrate or feed liquor into or away from the tubular electrodes. Counter electrodes 119 are mounted in the same manner and identical to those in FIG. 6. They are charged via electrical terminus 30 on tube sheet 118.

A shell head 106 is mounted at one end against shell 102 covering internal head 107 and providing an end of the appratus. At the other end, head 123 is mounted against the tube sheet 118 to form three chamber 113, 116, and 117. Head 123 has apertures at 114 and 115.

In operation, the counter electrodes 119 and tubular electrodes 103 are appropriately charged via electrical terminus and feed liquor is introduced through aperture 114 and caused to flow through the first two of tubular electrodes chamber 108. As the feed passes through the electrodes, part of the electrodepositable material is electrodeposited on these tubular electrodes and forced through the pores of the electrodes into the shell chamber. After the treated liquor is passed into chamber 108, it is forced back through the next two tubular electrodes discharging into chamber 116. Again electrodepositable material is removed by such pass. Treated liquor then is caused to flow from chamber 116 to chamber 105 and back through the tubular electrodes into the final chamber 117 for withdrawal through aperture 115. Four passes, then are provided with this apparatus which provides for increased efficiency, increased flow rate with good separation, and efficient removal. Any gas generated by such operation of the apparatus is removed through gas vents 125 and 124.

The tubular electrodes in each of the above cell apparatus can have a diameter of from about 1/2 inch to 2 inches with advantageous results being obtained where the tubular electrodes are about 3/4 of an inch to 1 1/2 inches inside diameter. Larger diameters; i.e., up to 1 1/2 inches are preferred where rods mounted inside the tubular electrodes act as the counter electrode. Smaller tubes can be used when the heads are used as the electrode in the apparatus. The length of the tubular electrodes can vary depending on the conductivity of the feed liquor used to charge the apparatus. There has to be sufficient conductivity to carry enough current to effect deposition of the material on the tubular electrodes. Generally, where the heads are used as the counter electrode, the tube length of the tubular electrode should be relatively short; e.g., 2 to 3 feet, as the conductivity of the feed liquor normally does not allow longer lengths of electrodes to be utilized. The degree of deposition at points distant from the head; e.g., 2 to 3 feet is minimal, and most of the deposition takes place at the points in the tubular electrode closest to the head means. On the other hand, where counter electrodes are mounted inside the tubular electrodes and extend the full length of the tubular electrode, lengths from 10 to 30 feet are acceptable as the distance between electrodes remains substantially constant and conductivity of the liquor normally does not inhibit deposition along the tubular electrode surface. When using such counter electrodes, tubular electrode lengths of 10 to 15 feet are preferred.

As stated, the tubular electrodes employed in practicing this invention have a porous section having a porosity size of about 5 to 100 microns. The porous section permits communication with a shell section in each of the apparatus. The tubes do not communicate with the shell section in any other manner, except through such porous section. The electrodes can be of different shapes; e.g., rectangular, circular, hexagonal, octagonal, and so forth. For reasons of efficiency and economy, the tubular electrodes are typically circular in shape, as these are easy to secure and seal in the tube sheet.

The counter electrodes are provided by the head means or other parts wired as an electrode. The counter electrodes are usually rod-like electrodes as these are most efficient and provide greater flexibility with the apparatus and operation thereof. The rod-like electrodes can be solid, tubular, or wire. The surface can be porous or nonporous, generally the latter. Further, such electrode can have a variety of shapes; e.g., square, circular, and octagonal.

Both the tubular electrode and counter electrodes are charged via electrical terminus. Methods of charging such electrodes are known to those skilled in the art, as for example, the tubular electrodes can be charged by the tube sheet or individually through separate terminus. Of course, the electrodes cannot be in physical contact with each other, but only in electrical contact provided by the liquor medium. Therefore, appropriate electrical insulation is used in the apparatus to prevent direct physical contact and as a short circut of the electrodes.

The apparatus of the instant invention can be operated under a wide variety of conditions for the electrodeposition of electrodepositable material contained in the feed liquor and recovery thereof. Such conditions are set forth in my earlier U.S. applications mentioned before. Generally, the cathode or anode, depending on the type of depositable material is operated at a temperature of around 130°–150° F. so that the depositable material will remain in fluent form during deposition. Such temperatures provide for easy recovery of the concentrate and easy removal from the surface of the electrode. Heat can be supplied to the electrodes by incorporating a heater element or wrapping a strip around the counter rod electrodes. A pressure drop from 2–15 pounds per square inch across the tubular electrodes is generally sufficient to cause the electrodeposit to flow through the pores in the tubular electrodes.

In each of the apparatus, a voltage is applied through the electrical termini connected to the head where the head is to be the counter electrode or to the counter rod-like electrodes and tubular electrode. The voltage establishing the anode and cathode of the shell apparatus should be unidirectional. It can be pulsed or have shaped nodes, but preferably is rectified A.C. with not more than about a 15% ripple factor. Straight line direct current power, where available, of course, can be used with excellent effect. The voltage used is generally above that necessary to electrolytically dissociate some of the vehicle of the feed liquor. In most cases, the liquor vehicle is water, and such dissociation is above about 1.8 volts whereby hydrogen is liberated from the cathode and oxygen from the anode. Voltage must also be above the voltage for electrodeposition of depositable material; i.e., fluent slime, electrocoating resin, paint, or other material. Ordinarily, this is a minimum of 5–10 volts and up to about 250 volts.

The foregoing description of embodiments of the invention is not to be construed as limiting as other embodiments of modified design using the techniques disclosed will also work effectively.

What is claimed is:
1. Pressure cell apparatus for the treatment of electrically conductive feed liquor, said apparatus comprising:
   (1) an impervious shell having aperture means for passage of fluid and defining a shell chamber;
   (2) an array of tubular electrodes extending into said shell chamber and having at least one open end per tubular electrode, said tubular electrodes being microporous at least as to a portion thereof extending into said shell chamber and being readily permeable to said feed liquor, the interiors of said tubular electrodes not otherwise communicating with said shell chamber;
   (3) at least one tube sheet means securing said array of tubular electrodes in said shell;
   (4) impervious head means disposed for forming at least one head chamber between itself and said tube sheet means, the open ends of said array of tubular electrodes communicating with said head chamber, said head means having aperture means for passage of fluid;
   (5) counter electrodes electrically chargeable to polarity opposite to said tubular electrodes and extending into said tubular electrodes; and
   (6) electrical termini for charging said tubular electrodes and said counter electrodes.

2. The apparatus of claim 1 wherein said tube sheet means is a single tube sheet, and said head means comprises a single head.

3. The apparatus of claim 1 wherein said tube sheet means is a pair of tube sheets, said tubular electrodes having two open ends per electrode, and said head means comprises a pair of heads.

4. The apparatus of claim 1 wherein said microporous section of said tubular electrodes has an absolute pore size of from about 5–100 microns.

5. The apparatus of claim 1 wherein said counter electrodes extend inside said tubular electrodes, but are not in direct contact therewith.

6. The apparatus of claim 1 wherein said tubular electrodes are secured in said shell so that their longitudinal axis are substantially parallel with each other.

7. The apparatus of claim 1 wherein said tubular electrodes are arranged for multipass flow wherein.

References Cited
UNITED STATES PATENTS

| | | | |
|---|---|---|---|
| 2,900,320 | 8/1959 | Metcalfe et al. | 204—300 R |
| 3,379,634 | 4/1968 | Rutkowski | 204—267 |
| 3,506,562 | 4/1970 | Coackley | 204—300 R |

JOHN H. MACK, Primary Examiner

W. I. SOLOMON, Assistant Examiner

U.S. Cl. X.R.

204—180 R, 284, 299, 302

UNITED STATES PATENT OFFICE
CERTIFICATE OF CORRECTION

Patent No. 3,798,150  Dated  March 19, 1974

Inventor(s) Allan E. Gilchrist

It is certified that error appears in the above-identified patent and that said Letters Patent are hereby corrected as shown below:

Column 1, line 28, before "liquor" insert -- conductive --; line 49, "canductive" should read -- conductive --; line 55, "therein to" should read -- thereon --. Column 2, line 3, "in" should read -- is --; line 28, "aspects" should read -- aspect --; line 49, cancel "of". Column 4, line 46, "5-10" should read -- 5-100 --. Column 8, line 10, "appratus" should read -- apparatus --.

Signed and sealed this 1st day of October 1974.

(SEAL)
Attest:

McCOY M. GIBSON JR.
Attesting Officer

C. MARSHALL DANN
Commissioner of Patents